United States Patent
Maria

(10) Patent No.: US 9,940,142 B2
(45) Date of Patent: Apr. 10, 2018

(54) CONNECTED CAR RESOURCE MANAGER WITH ASSOCIATED APPLICATIONS CONTROL

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

(*) Notice: Subject to any disclaimer, the term of this patent is extended or adjusted under 35 U.S.C. 154(b) by 1 day.

(21) Appl. No.: 15/161,184

(22) Filed: May 20, 2016

(65) Prior Publication Data

US 2017/0337068 A1    Nov. 23, 2017

(51) Int. Cl.
*G06F 9/40* (2006.01)
*G06F 9/44* (2018.01)
(Continued)

(52) U.S. Cl.
CPC .............. *G06F 9/4411* (2013.01); *G06F 8/61* (2013.01); *G07C 5/0808* (2013.01); *H04L 67/12* (2013.01); *H04L 67/18* (2013.01); *H04L 67/34* (2013.01)

(58) Field of Classification Search
CPC ....... G06F 9/4411; G06F 8/61; G07C 5/0808; H04L 67/12; H04L 67/18; H04L 67/34
(Continued)

(56) References Cited

U.S. PATENT DOCUMENTS 7,813,326 B1    10/2010  Kelm et al.
7,885,285 B2     2/2011  Fukuyama
(Continued)

FOREIGN PATENT DOCUMENTS

CA    2757647 A1   12/2009
CN    102307332 A   1/2012
(Continued)

OTHER PUBLICATIONS

Toor et al., "Vehicle ad hoc networks: applications and related technical issues." Communications Surveys & Tutorials, IEEE 10.3 (2008): 74-88. 3rd Quarter 2008, vol. 10, No. 3. [https://www.researchgate.net/profile/Paul_Muhlethaler/publication/3454705_Vehicle_ad_hoc_networks_Applications_and_related_technical_issues. IEEE_Communications_/links/00b49521b737058c17000000.pdf]. Retrieved on Mar. 9, 2016, 15 pages.

(Continued)

*Primary Examiner* — Marthe Y Marc-Coleman
(74) *Attorney, Agent, or Firm* — Amin, Turocy & Watson, LLP

(57) ABSTRACT

Managing vehicle resources by a network device in lieu of a designated vehicle control device is disclosed. A connected car resource manager of a carrier core network can receive vehicle information intended for the designated vehicle control device. The connected car resource manager can determine a response command that can be substituted for a command from the designated vehicle control device update a parameter of the vehicle. The response command can be based on the vehicle information, supplementary information, etc. Moreover, the response command can be adapted based on a second tier of supplementary information by another carrier core network device. In some embodiments, the connected car resource manager can share management of response commands with the designated vehicle control device vehicle. The connected car resource manager can employ information about other vehicles connected to a network that is not available to the designated vehicle control device.

20 Claims, 10 Drawing Sheets

(51) Int. Cl.
*H04L 29/08* (2006.01)
*G07C 5/08* (2006.01)
*G06F 9/445* (2018.01)

(58) Field of Classification Search
USPC .................................. 701/36, 31.4; 717/173
See application file for complete search history.

(56) References Cited

U.S. PATENT DOCUMENTS

| | | | |
|---|---|---|---|
| 8,106,792 B2 | 1/2012 | Chen et al. | |
| 8,233,389 B2 | 7/2012 | Yim et al. | |
| 8,295,257 B2 | 10/2012 | Chen et al. | |
| 8,412,107 B2 | 4/2013 | Hamada et al. | |
| 8,488,545 B2 | 7/2013 | Chen et al. | |
| 8,570,994 B2 | 10/2013 | Chen et al. | |
| 9,036,509 B1 | 5/2015 | Addepalli et al. | |
| 9,086,941 B1* | 7/2015 | Siegel | G06F 8/65 |
| 9,225,782 B2 | 12/2015 | Addepalli et al. | |
| 9,648,107 B1* | 5/2017 | Penilla | H04L 67/12 |
| 9,697,503 B1* | 7/2017 | Penilla | G06Q 10/20 |
| 2004/0215373 A1 | 10/2004 | Won et al. | |
| 2013/0282263 A1 | 10/2013 | Tee | |
| 2014/0075506 A1 | 3/2014 | Davis et al. | |
| 2014/0149032 A1* | 5/2014 | Barrett | G01C 21/26 701/409 |
| 2015/0109962 A1 | 4/2015 | Liao et al. | |
| 2016/0306624 A1* | 10/2016 | Vangelov | G06F 8/665 |
| 2017/0024201 A1* | 1/2017 | Diedrich | G06F 8/65 |

FOREIGN PATENT DOCUMENTS

| | | |
|---|---|---|
| CN | 102665168 A | 9/2012 |
| CN | 103763334 A | 4/2014 |
| CN | 103824457 A | 5/2014 |
| CN | 104331292 A | 2/2015 |
| CN | 104853351 A | 8/2015 |
| EP | 2127263 B1 | 12/2009 |
| WO | 2015017483 A1 | 2/2015 |
| WO | 2015019234 A1 | 2/2015 |
| WO | 2015075569 A1 | 5/2015 |
| WO | 2016015764 A1 | 2/2016 |

OTHER PUBLICATIONS

Chen et al., "Ad hoc relay wireless networks over moving vehicles on highways." Proceedings of the 2nd ACM international symposium on Mobile ad hoc networking & computing, ACM, 2001. [http://www.eecs.harvard.edu/~htk/publication/2001-mobihoc-ckv.pdf]. Retrieved on Mar. 9, 2016, 4 pages.

Yin et al., "Performance evaluation of safety applications over DSRC vehicular ad hoc networks." Proceedings of the 1st ACM international workshop on Vehicular ad hoc networks. ACM, 2004. [https://www.researchgate.net/profile/Bo_Ryu/publication/220926587_Performance_evaluation_of_safety_applications_over_DSRC_vehicular_ad_hoc_/inks/0912f51243fcdb05ee000000.pdf]. Retrieved on Mar. 9, 2016, 9 pages.

Yousefi et al. "Vehicular ad hoc networks (VANETs): challenges and perspectives." ITS TelecommunicationsProceedings, 2006 6th International Conference, IEEE, 2006. Retrieved on Mar. 9, 2016, 6 pages.

Lochert, et al. "A routing strategy for vehicular ad hoc networks in city environments." Intelligent Vehicles Symposium, 2003. Proceedings. IEEE. IEEE, 2003. [http://www.prism.uvsq.fr/~mogue/M2IRS/Biblio/VANET/Articles/Articles_bis/Protocole-GSR/routing-strategy-%20GSR.pdf]. Retrieved on Mar. 9, 2016, 6 pages.

Nandan et al. "Co-operative downloading in vehicular ad-hoc wireless networks." Wireless On-demand Network Systems and Services, 2005. WONS 2005. Second Annual Conference, IEEE, 2005. [http://www.cs.ucla.edu/~gpau/Giovanni_Paus_Home_Page/Publications_files/C022-2005-WONS-BP.pdf]. Retrieved on Mar. 9, 2016, 10 pages.

* cited by examiner

CONNECTED CAR RESOURCE MANAGER WITH ASSOCIATED APPLICATIONS CONTROL

TECHNICAL FIELD

The disclosed subject matter relates to managing vehicle resources, e.g., determining a command to update a vehicle system based on information about the vehicle received at a network device.

BACKGROUND

By way of brief background, conventional connected vehicles generally send vehicle data to a remotely located control center designated by the manufacturer of the vehicle. This control center analyzes the vehicle data and determines commands to be sent back to the vehicle to update vehicle operations. As connected vehicles proliferate and where the connected vehicles are often in regular, if not constant, communication with a designated control center, a significant amount of bandwidth can be consumed to support communications between the connected vehicle and the control center. In addition to the consumed bandwidth, the end-to-end communication structure, e.g., between the connected vehicle and the control center, can take longer than communications between the connected vehicle and an intermediate network. Moreover, the conventional end-to-end communication structure can be ignorant of vehicle information for vehicles of different manufacturers, e.g., the vehicle/command data can be siloed by manufacturer such that, for example, communications for alfa-brand vehicles can be ignorant of beta-brand vehicle information. These issues can be exacerbated where real time information from sensors can be expected to increase as additional sensors become increasingly common in modern vehicles.

DETAILED DESCRIPTION

Figure 1:
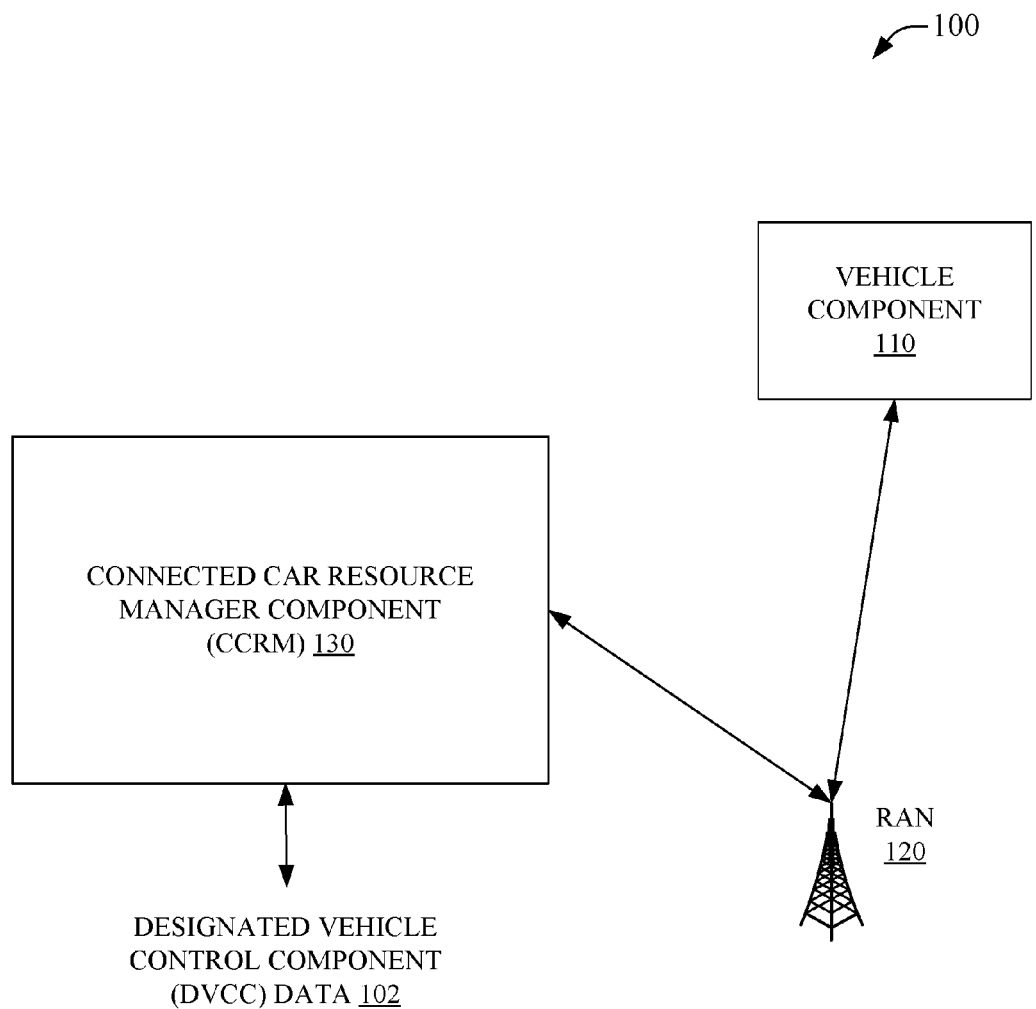
FIG. 1 is an illustration of an example system that facilitates management of a vehicle resource via a network device of a network associated with a network provider in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The art and science of managing and controlling connected vehicles is evolving rapidly. Conventional connected vehicles generally send vehicle data to a remotely located control center designated by the manufacturer of the vehicle. This control center analysis the vehicle data and determines commands to be sent back to the vehicle to update vehicle operations. As an example, an electric vehicle can send information to a control center indicating a battery management firmware version. Where the firmware is determined to be out of date, the control center can return a command that the vehicle retrieve and install a newer firmware when the vehicle is next connected to a charging station. This can result in the vehicle updating the battery management firmware. As connected vehicles proliferate and where the connected vehicles are often in regular, if not constant, communication with a designated control center, a significant amount of bandwidth can be consumed to support communications between the connected vehicle and an intermediate network, the intermediate network and the control center, and on the return of a command, the control center and the intermediate network, and the intermediate network and the connected vehicle. In addition to the consumed bandwidth, the end-to-end communication structure, e.g., between the connected vehicle and the control center, can take longer than communications between the connected vehicle and the intermediate network. Moreover, the conventional end-to-end communication structure can be ignorant of vehicle information for vehicles of different manufacturers, e.g., the vehicle/command data can be siloed by manufacturer such that, for example, communications for alfa-brand vehicles can be ignorant of beta-brand vehicle information. These issues can be exacerbated where real time information from sensors can be expected to increase as additional sensors become increasingly common in modern vehicles. Connected vehicle information can be obtained from a variety of mobile applications residing in a connected vehicle, e.g., collection sensor data, determining performance information, receiving user input, etc. The mobile applications can be responsive to commands or updates received from a remotely located control center. This can allow ready adaptation of connected vehicle resources and can improve vehicle operation efficiency, traffic management, emergency response, access to new or improved features, etc.

In conventional connected vehicle scenarios, a network provider, e.g., a network carrier, can be treated as a 'dumb pipe', e.g., merely passing data through the network between the connected vehicle and the conventional control center. Wherein a connected vehicle typically has one or more universal subscriber identity module (USIM), or similar device, which can enable the connected vehicle to connect through the carrier network to an end-point, e.g., a control center, the carrier network can be improved to enable a carrier to add value to the process by leveraging network visibility that can be unique to the carrier. Where a carrier can access data from many sources not typically available to a connected vehicle manufacturer, e.g., vehicle data from connected cars of more than one manufacturer, supplementary data, etc., traversing the carrier network, this additional information can affect determinations related to returning commands to the connected vehicle. In an aspect, carrier intervention can enable communicating commands that can direct, for example, the mobile applications residing on a car on a real-time basis to take certain actions in response to location, weather, adverse road conditions, emergency response, temperature, software updates, vehicle density, traffic, accidents, etc., without direct intervention of a vehicle manufacturer designated control center. As an example, this can allow a carrier that can determine the location of other cars, to direct cars to take certain routes, to take certain actions to avoid collisions, or minimize bad traffic routes without the intervention of a control center outside of the carrier network. This can be of particular benefit in a driver-less car environment where the carrier can be in an excellent position to direct certain actions to mobile applications of a connected vehicle.

Managing mobile applications residing in a connect vehicle can center around two new network elements: (a) a Connected Car Resource Manager (CCRM), and (b) an Application Control System (ACS). The CCRM can communicate with a mobile application(s) resident in a connected vehicle to enable benefits related to adapting commands based on carrier provided data. The CCRM can interface with the connected car and, in some embodiments, with a vehicle manufacture designated control center, in order to direct and provide data to a mobile application(s) of the connected vehicle. The mobile application(s) residing in the connected vehicle can be controlled or provided with carrier enhanced data in response to, for example, environmental changes, direct control, human intervention, preprogrammed actions, etc. The CCRM can reduce and/or eliminate communications between the intermediate network and the control center, e.g., communications can be reduced to those between the connected vehicle and the CCRM as a surrogate for the control center, and thereby reduce bandwidth consumption, increase communication speed, incorporate data from other connected vehicles (non-siloed data), from supplementary data sources, etc.

The CCRM can operate in tandem with an ACS. In an embodiment, the ACS can reside in a carrier network. The ACS can be implemented in an Evolved Packet Core network as a standalone network element or as a Virtual Network Function (SDN/NFV). The ACS can act as a more centralized management entity that can track mobile applications running in the connected cars connected to the carrier network. The ACS can receive information from a CCRM for a vehicle, combine this information with knowledge about other vehicles connected to the network and/or supplementary data, and communicate a response, e.g., command adaptation information, back to the CCRM to adapt a command send back to the vehicle. In some embodiments, the ACS can receive CCRM data, determine a command adaptation, and communicate an adapted command directly to the vehicle, e.g., rather than back through the CCRM. An ACS-adapted command can be issued to one vehicle, e.g., directly or via one or more CCRM, or to multiple vehicles simultaneously, e.g., directly or via one or more CCRM. The ACS can contain, in some embodiments, a repository of data reflecting a status of connected vehicles, including which applications the vehicles are running, which applications the vehicles are allowed to run, whether or not a command determined by a CCRM is feasible/desirable, etc. This can allow, where there can be fewer ACSs and more CCRMs, resources to be applied to the ACS to have a wide effect, e.g., the CCRM can be a more prolific but less costly device in comparison to a more rare but more expensive ACS. As such, in this example, a CCRM can determine a command that an ACS, which can be more intelligent based on a dedication of resources to the ACS over the CCRMs, can determine whether or not the command is feasible/desirable, what sequence the command should be issued in, to which vehicles the command should be sent, etc. The example command can then be adapted/issued by the ACS to the connected car via the carrier network, e.g., directly or through the CCRM. This approach is different from the conventional way connected cars work today, where commands are issued directly to the connected car by an enterprise control center or by mobile applications that reside in the car bypassing any value added activity associated with a carrier network. By implementing a CCRM and an ACS, along with associated databases, a carrier can add value where the carrier can have knowledge of, for example, where all of the connected vehicles are, positions relative to each other, prescribed connected vehicle capabilities, mobile applications residing on a connected vehicle, and many other sources of information that can be leveraged by the CCRM and/or ACS in relation to control the connected vehicle car. Of note, the disclosed techniques can be applied to other internet of things (IOT) devices or components without departing form the disclose subject matter and, while not explicitly recited for the sake of clarity and brevity, all such IOT applicable embodiments are to be considered within the scope of the instant disclosure.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates management of a vehicle resource via a network device of a network associated with a network provider in accordance with aspects of the subject disclosure. System 100 can comprise, vehicle component 110. In an aspect, vehicle component 110 can communicate vehicle information to a control component located away from the vehicle. The control component can be operated by a manufacturer of a vehicle comprising vehicle component 110, can be a control component designated, such as by a vehicle manufacturer, for communicating with vehicle component 110, etc. As an example, an alpha-brand vehicle can comprise vehicle component 110 that can communicate data with an alpha-brand designated vehicle control component (DVCC) to respond with commands that update an aspect of the alpha-brand vehicle based on the communicated data. As such, for example, a vehicle can communicate data to a DVCC from a brake sensor indicating that braking distance is not satisfactory according to a corresponding breaking rule. In response, the DVCC can send a command to the vehicle that a service indicator light should be activated in the alpha-brand vehicle. Numerous other examples of vehicle related data and DVCC commands are not explicitly recited here for the sake of clarity and brevity but all such examples are nonetheless considered within the scope of the instant disclosure.

System 100 can further comprise radio access network (RAN) component 120, hereinafter RAN 120. RAN 120 can comprise a network edge device that can receive vehicle data from vehicle component 110 and communicate the vehicle data to, and return the reply command from, a DVCC (not illustrated) via a network associated with a network carrier. In an aspect, RAN 120 can communicate vehicle data to connected car resource manager (CCRM) component 130, hereinafter CCRM 130, via the network, rather than to a DVCC. Similarly, RAN 120 can return a command to vehicle component 110 from CCRM 130 in lieu of a command from a DVCC.

CCRM 130 can receive vehicle data from vehicle component 110 via RAN 120. CCRM 130 can pass, in an embodiment, vehicle data to a DVCC as DVCC data 102. CCRM can return a command from a DVCC, e.g., comprised in DVCC data 102, to vehicle component 110 via RAN 120. In another embodiment, CCRM 130 can emulate aspects of a DVCC to reduce the amount of vehicle data communicated to/from a DVCC via DVCC data 102.

In an aspect, emulation of aspects of a DVCC can comprise direct emulation of the DVCC, e.g., the CCRM performs the same functions as the DVCC based on similar/same data and providing similar/same responses, or a modified emulation of the DVCC, e.g., CCRM 130 can perform different processing and analysis of vehicle data from vehicle component 110 and/or supplementary data, and can return a corresponding command in a from that is germane to DVCC/vehicle communication but may not be the same as would be returned by a DVCC due to differences in processing of vehicle data and/or supplementary data, analysis of the processed vehicle data, application of an alternative or additional rule in generating a response command, an indication of command adaptation information, etc. In brief, CCRM 130 can emulate a DVCC, be a substitute for a DVCC, or be a replacement for a DVCC, wherein the substitution or replacement of the DVCC by CCRM 130 can perform the same, similar, or different actions as the DVCC.

In an aspect, CCRM 130 can intercept vehicle data from vehicle component 110. In an embodiment, CCRM 130 can simply pass this information to, and return a command from, a DVCC via DVCC data 102, e.g., CCRM 130 can be invisible to the vehicle and DVCC in the network. In another embodiment, CCRM 130 can receive and response to vehicle data from vehicle component 110 directly, e.g., vehicle data is not passed on to elicit a response command from a DVCC and the processing and response is managed by CCRM 130. In this type of embodiment, CCRM 130 can report out DVCC data that, for example, can be a summary of communications with one or more vehicles and responses thereto, e.g., a reporting function, rather than passing vehicle data to generate a reply command. DVCC data 102 can comprise other information relating to the interaction between vehicle component 110 and CCRM 130 as well, such as reporting of supplementary data, performance information relating to the operation of CCRM 130, vehicular trends based on CCRM operations with a plurality of vehicles, etc. In other embodiments, CCRM 130 can forward some vehicle data to a DVCC in DVCC data 102 while not communicating other data to/from the DVCC. In these embodiments, CCRM 130 can manage, for example, typical responses but pass on unusual vehicle data to the DVCC for a response thereto. As other examples, a vehicle manufacturer can specify what functions CCRM 130 can or cannot manage in lieu of a DVCC, CCRM 130 can manage overflow conditions where a DVCC may be overburdened or otherwise unavailable, etc. As such, nearly any condition can be used to demark what aspects of a vehicle are managed by a DVCC and what are managed by CCRM 130, all of which scenarios are considered within the scope of the present disclosure. As an example, a connected vehicle with an aftermarket engine control chip can be associated with CCRM 130 management of all functions other than those associated with the aftermarket chip, which functions are routed to the DVCC.

In an aspect, CCRM 130 can be comprised in a network edge device, in a core-network device, in a cloud-computing environment device, etc. CCRM 130 can be a real or virtual device. In an aspect, CCRM 130 can communicate with an applications control system (ACS) component, e.g., 240, etc., though not illustrated in FIG. 1. ACS, as will be disclosed more fully herein, can emulate aspects of CCRM 130, perform additional analysis, etc., to allow for improved management of a connected vehicle as disclosed herein. As an example, CCRM 130 can determine a response to vehicle data from vehicle component 110. This example response can be adapted by an ACS component based on information about other vehicles or conditions in an area, e.g., information that can be available to, or be reasonably processed by, the ACS component but not CCRM 130, e.g., the ACS can be considered as addressing large data sets in comparison to data sets associated with CCRM 130. Other examples can be readily appreciated but are reserved in the interest of clarity and brevity, though such examples are within the present scope of disclosure.

Figure 2:
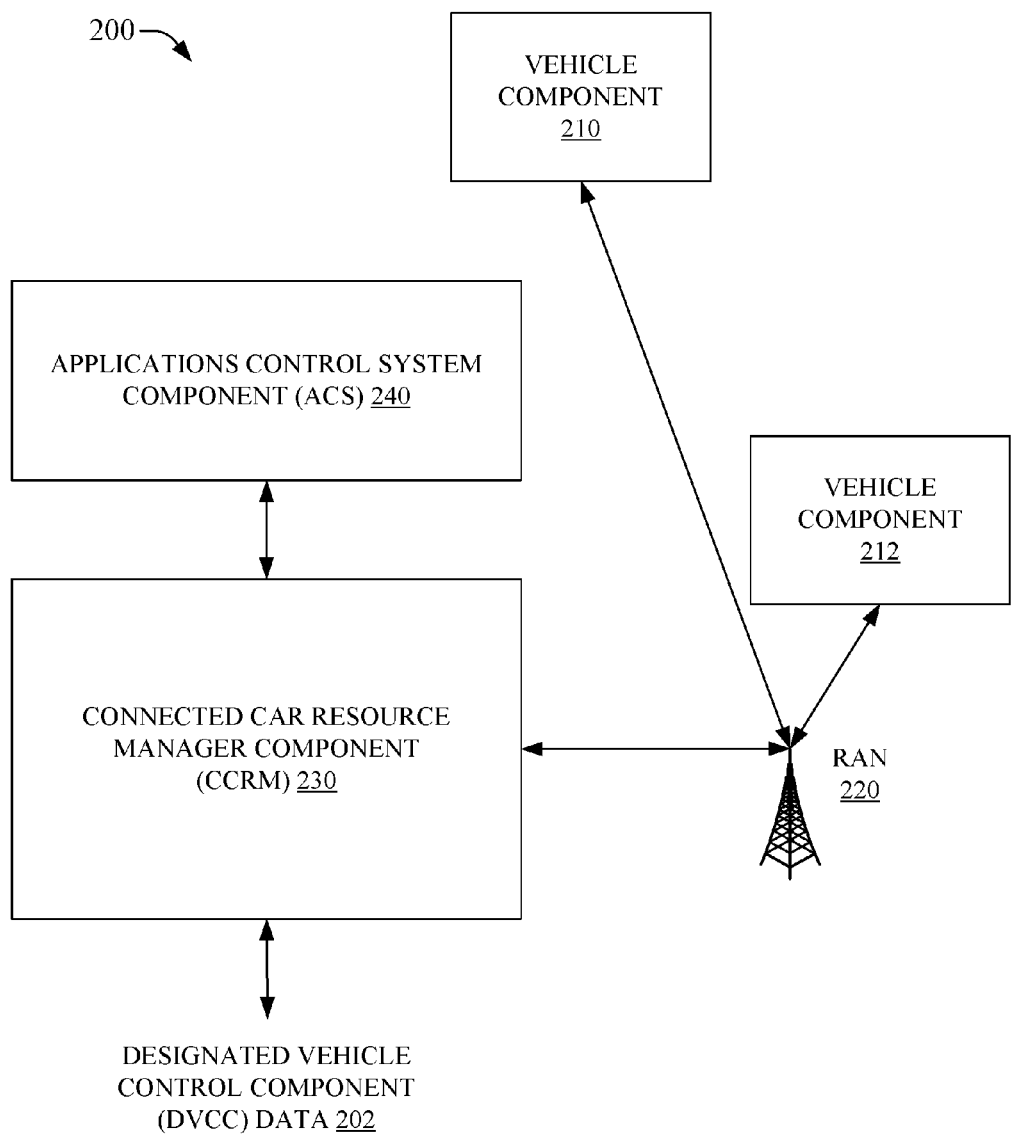
FIG. 2 is a depiction of an example system that facilitates management of a vehicle resource, based on information for a plurality of vehicles, via a network device of a network associated with a network provider in accordance with aspects of the subject disclosure.

FIG. 2 is a depiction of a system 200 that can facilitate management of a vehicle resource, based on information for a plurality of vehicles, via a network device of a network associated with a network provider in accordance with aspects of the subject disclosure. System 200 can comprise vehicle component 210 and vehicle component 212. In an aspect, vehicle component 210 can communicate vehicle information to a control component, via RAN 220, located away from a corresponding vehicle. Similarly, vehicle component 212 can communicate, via RAN 220, vehicle information to the same, or different, control component located away from another corresponding vehicle. The control component(s) can be operated by a manufacturer(s) of the vehicles corresponding to vehicle components 210 and 212, can be a control component(s) designated for communicating with vehicle components 210 and 212, etc. As an example, an alpha-brand vehicle can comprise vehicle component 210 and a beta-brand vehicle can comprise vehicle component 212. In this example, vehicle component 210 can communicate data with an alpha-brand DVCC to respond with commands that update an aspect of the alpha-brand vehicle based on the corresponding communicated data and vehicle component 212 can communicate data with a beta-brand DVCC to respond with commands that update an aspect of the beta-brand vehicle based on the corresponding communicated data. Vehicle data from vehicle component 210/212 can be communicated to, and a reply command returned from, a corresponding DVCC (not illustrated) via a network associated with a network carrier. In an aspect, vehicle data can be communicated to CCRM 230, via the network, rather than to a DVCC. Similarly, a command to vehicle component 210/212 can be returned from CCRM 230 in lieu of a command from a DVCC. In an aspect, CCRM 230 can emulate, substitute for, or replace, one or more DVCCs, e.g., CCRM 230 can receive from, or send to, vehicle component 210 and 212, rather than vehicle component 210 and 212 communicating with one or more corresponding DVCCs. As an example, where vehicle component 210 is associated with an alpha-brand vehicle that would normally communicate with an alpha-brand DVCC and vehicle component 212 is associated with a beta-brand vehicle that would normally communicate with a beta-brand DVCC, CCRM 230 can function to emulate/substitute/replace one or both the alpha- and beta-brand DVCCs. As a further example, where vehicle component 210 and 212 are both associated with an alpha-brand vehicle that would normally communicate with an alpha-brand DVCC, CCRM 230 can function to emulate/substitute/replace the alpha-brand DVCC.

CCRM 230 can receive vehicle data from vehicle component 210 and 212 via RAN 220. CCRM 230, in an embodiment, can pass vehicle data to a corresponding DVCC as DVCC data 202. CCRM can return a command from a corresponding DVCC, e.g., comprised in DVCC data 202, to vehicle component 210/212 via RAN 220. In another embodiment, CCRM 230 can emulate aspects of one or more DVCCs to reduce the amount of vehicle data communicated to/from a DVCC via DVCC data 202. In an aspect, CCRM 230 can be comprised in a network edge device, in a core-network device, in a cloud-computing environment device, etc. CCRM 230 can be a real or virtual device.

In an aspect, emulation of aspects of a DVCC can comprise direct emulation of the DVCC, e.g., the CCRM performs the same functions as the DVCC based on similar/same data and providing similar/same responses, or a modified emulation of the DVCC, e.g., CCRM 230 can perform different processing and analysis of vehicle data from vehicle component 210/212 and/or supplementary data, and can return a corresponding command in a from that is germane to DVCC/vehicle communication but may not be the same as would be returned by a DVCC due to differences in processing of vehicle data and/or supplementary data, analysis of the processed vehicle data, application of an alternative or additional rule in generating a response command, an indication of command adaptation information, etc. In brief, CCRM 230 can emulate a DVCC, be a substitute for a DVCC, or be a replacement for a DVCC, wherein the substitution or replacement of the DVCC by CCRM 230 can perform the same, similar, or different functions of the DVCC.

In an aspect, CCRM 230 can intercept vehicle data from vehicle component 210/212. In an embodiment, CCRM 230 can simply pass this information to, and return a command from, a DVCC via DVCC data 202, e.g., CCRM 230 can be invisible to the vehicle and DVCC in the network. In another embodiment, CCRM 230 can receive and respond to vehicle data from vehicle component 210/212 directly, e.g., vehicle data is not passed on to elicit a response command from a DVCC and the processing and response is managed by CCRM 230. In this type of embodiment, CCRM 230 can report out DVCC data 202 that, for example, can be a summary of communications with one or more vehicles and responses thereto, e.g., a reporting function, rather than passing vehicle data to generate a reply command. DVCC data 202 can comprise other information relating to the interaction between vehicle component 210/212 and CCRM 230 as well. In other embodiments, CCRM 230 can forward some vehicle data to a DVCC in DVCC data 202 while not communicating other data to/from the DVCC.

System 200 can further comprise ACS 240. In an aspect, ACS 240 can communicate with CCRM 230. ACS 240 can emulate aspects of CCRM 230, perform additional analysis, etc., to allow for improved management of a connected vehicle as disclosed herein. In an embodiment, ACS 240 can offload functions from CCRM 230. Offloading of functionality can allow CCRM 230 to be allocated to a first tier of tasks and ACS 240 to be allocated to a second tier of tasks, e.g., the first tier can be tasks associated with other data from a vehicle and generating a standard response, while the second tier of tasks can be associated with area-wide vehicle trends that can be employed to alter the standard response generated by CCRM 230. As an example, where vehicle component 210 indicates that road noise is sufficiently high, CCRM 230 can determine a command that causes a speed dependent volume of vehicle voice prompts to more aggressively become louder as speed increases. This information and the determined command can be passed to ACS 240 that can determine that road noise is increased only in a small area, for example, based on vehicle data from vehicle component 212 for another vehicle proximate to the vehicle associated with vehicle component 210. As such, ACS 240 can update the command to be moderately more aggressive in adjusting the voice prompt volume as speed increases based on a determination that the vehicle will soon be outside of the increased road noise area. Other examples can be readily appreciated but are reserved in the interest of clarity and brevity, though such examples are within the present scope of disclosure.

In an aspect ACS 240 can comprise rule silos, e.g., related to vehicle manufacturers, etc. This can enable vehicle manufacturers, aftermarket parts suppliers, etc., to specify appropriate response commands based on a type of vehicle, part, modification, etc. As such, CCRM 230 can generate a suggested response that can be altered by ACS 240 based on the siloed rules. As an example, a vehicle of vehicle component 210 can share vehicle data to CCRM 230 that can determine a change in idle speed is an appropriate response. This information can be sent to ACS 240, which can determine that the idle speed should be further altered based on the vehicle being determined to be a ZZZ-model gamma-brand vehicle associated with a gamma-brand rule indicating the further altered idle speed is an appropriate response for type ZZZ-model vehicles.

Figure 3:
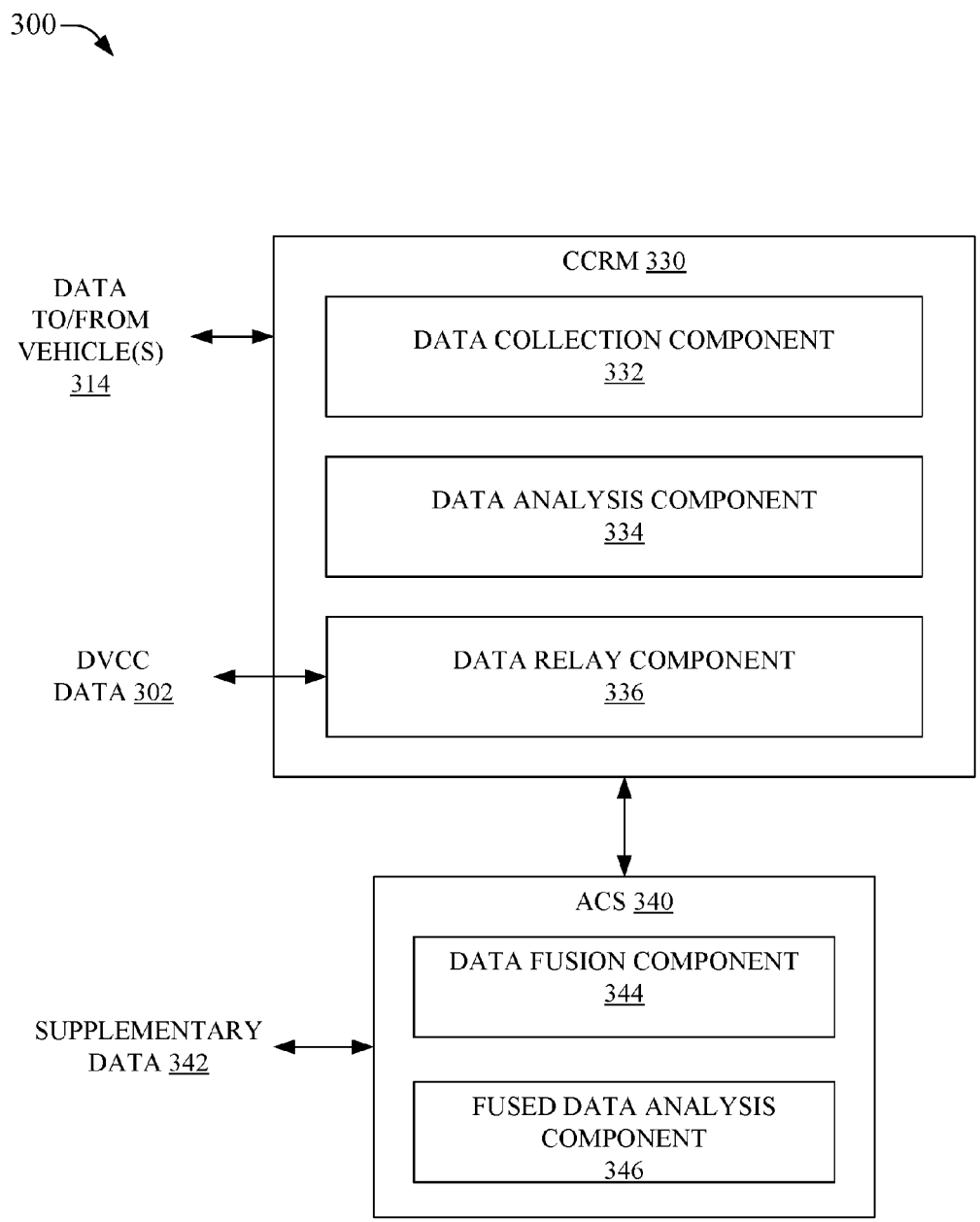
FIG. 3 illustrates an example system that facilitates management of a vehicle resource, based on vehicle information and supplementary information, via a network device of a network associated with a network provider in accordance with aspects of the subject disclosure.

FIG. 3 illustrates a system 300 that facilitates management of a vehicle resource, based on vehicle information and supplementary information, via a network device of a network associated with a network provider in accordance with aspects of the subject disclosure. System 300 can comprise CCRM 330. CCRM 330 can receive vehicle data 314. CCRM 330, in an embodiment, can pass vehicle data 314 to a corresponding DVCC as DVCC data 302 via data relay component 336. CCRM can return a command from a corresponding DVCC, e.g., comprised in DVCC data 302, via data 314. In another embodiment, CCRM 330 can emulate aspects of one or more DVCCs to reduce the amount of vehicle data communicated to/from a DVCC via DVCC data 302. In an aspect, CCRM 330 can be comprised in a network edge device, in a core-network device, in a cloud-computing environment device, etc. CCRM 330 can be a real or virtual device.

In an aspect, a vehicle can communicate vehicle information to a control component located away from the vehicle. The control component can be operated by a manufacturer of the vehicle, can be a control component designated for communicating with the vehicle, etc. As an example, an alpha-brand vehicle can communicate data with an alpha-brand DVCC that can respond with commands that update an aspect of the alpha-brand vehicle based on the communicated data. Vehicle data can be communicated to, and a reply command returned from, a DVCC via a network associated with a network carrier. In an aspect, vehicle data can be communicated to CCRM 330, via the network, rather than to a DVCC. Similarly, a command can be returned from CCRM 330 in lieu of a command from a DVCC. In an aspect, CCRM 330 can emulate, substitute for, or replace, one or more DVCCs.

In an aspect, emulation of aspects of a DVCC can comprise direct emulation of the DVCC, e.g., CCRM 330 can perform the same functions as the DVCC based on similar/same data and providing similar/same responses, or a modified emulation of the DVCC, e.g., CCRM 330 can perform different processing and analysis of vehicle data and/or supplementary data, and can return a corresponding command in a from that is germane to DVCC/vehicle communication but may not be the same as would otherwise be returned by a DVCC due to differences in processing of vehicle data and/or supplementary data, analysis of the processed vehicle data, application of an alternative or additional rule in generating a response command, an indication of command adaptation information, etc. In brief, CCRM 330 can emulate a DVCC, be a substitute for a DVCC, or be a replacement for a DVCC, wherein the substitution or replacement of the DVCC by CCRM 330 can perform the same, similar, or different functions of the DVCC.

CCRM 330, in an embodiment, can comprise data collection component 332. In an aspect, data collection component 332 can capture vehicle data. In an embodiment, data collection component 332 can simply pass this information to, and return a command from, a DVCC, via data relay component 336 as DVCC data 302, e.g., CCRM 330 can be invisible to the vehicle and DVCC in the network. In another embodiment, data collection component 332 can intercept vehicle data, e.g., vehicle data is not passed on to a DVCC, wherein the processing and response is managed by data analysis component 334. In other embodiments, data collection component 332 can forward some vehicle data to a DVCC in DVCC data 302 while not communicating other data to/from the DVCC.

CCRM 330, in some embodiments, can comprise data analysis component 334. Data analysis component 334 can process vehicle data captured by data collection component 332. In some embodiments, analysis can be further based on supplementary data, e.g., 342, received by CCRM 330. Supplementary data can be data known to a network associated with CCRM 330, such as vehicle location, weather, a schedule from a profile associated with aa user of a the vehicle, traffic patterns proximate to the vehicle, emergent information, transit patterns, data throughput key performance indicators (KPIs), etc., for example as supplementary data 342 received from ACS 340. In some embodiments, supplementary data can be received directly, not illustrated, at CCRM 330, e.g., via data collection component 332. As an example related to supplementary data use, vehicle information indicating a remaining charge level of an electric vehicle can be captured by data collection component 332. This remaining charge information can be combined with information relating to known locations of compatible charging stations and the drivers plans for interstate travel gleaned from a user profile calendar, e.g., supplementary data, by data analysis component 334, to generate a command that alerts the driver that the vehicle should be charged before departing on the trip to avoid becoming stranded.

CCRM 330 can comprise, in some embodiments, data relay component 336. Data relay component 336 can communicate all, some, related, or no data with a DVCC via DVCC data 302. In an embodiment where CCRM 330 is transparent to the DVCC and a vehicle component, data relay component 336 can communicate vehicle data collected by data collection component 332 to the DVCC and return a response from the DVCC to the vehicle. In an embodiment where CCRM 330 is not transparent, data relay component 336 can communicate some or different data to the DVCC, e.g., CCRM 330 can manage designated tasks and relay other information to a DVCC for management of non-designated tasks, data relay component 336 can communicate summary data, etc. In embodiments where CCRM 330 is a replacement for DVCC, no data may be communicated with/from a DVCC by data relay component 336 because CCRM 330 itself manages all communication tasks with the vehicle as a replacement for the DVCC.

System 300 can further comprise ACS 340. In an aspect, ACS 340 can communicate with CCRM 330. ACS 340 can emulate aspects of CCRM 330, perform additional analysis, etc., to allow for improved management of a connected vehicle as disclosed herein. In an embodiment, ACS 340 can offload functions from CCRM 330. Offloading of functionality can allow CCRM 330 to be allocated to a first tier of tasks and ACS 340 to be allocated to a second tier of tasks. In an aspect ACS 340 can comprise rule silos, e.g., related to vehicle manufacturers, etc. This can enable vehicle manufacturers, aftermarket parts suppliers, etc., to specify appropriate response commands based on a type of vehicle, part, modification, etc. As such, CCRM 330 can generate a suggested response that can be altered by ACS 340 based on the siloed rules.

ACS 340 can receive supplementary data 342. In an aspect, supplementary data can be made accessible to CCRM 330 by ACS 340. Supplementary data 342 can further be employed by ACS 340 to process offloaded CCRM 330 functionality by ACS 340. In an embodiment, ACS 340 can comprise data fusion component 344 that can fuse data from multiple sources, e.g., from one or more vehicles, from one or more supplementary data sources, etc. As an example, data fusion component 344 can compile and merge data from some or all vehicles connected to a network, can fuse data from some or all profiles associated with operators of vehicles connected to the network, can merge weather, traffic, emergent data, etc., for a determined area, etc. Fused data analysis component 346 can analyze the fused data to determine command adaptation information. Command adaptation information can enable adaptation of a command, e.g., as determined by CCRM 330, to be made available to a vehicle. As an example, CCRM 330 can determine, based on vehicle data indicating jerky acceleration for a particular driver, that an accelerator pedal response profile should be updated to be less aggressive. This information can be received by ACS 330, which can fuse this information with, for example, age information on the driver, from a user profile, and weather information for the area the vehicle is in indicating fresh snow. Fused data analysis component 346 can then determine, for example, that the accelerator pedal response should be further lessened. This adaptation can be used to update the command sent to the vehicle to reduce the aggressiveness of the accelerator pedal profile for the vehicle.

In some embodiments, both CCRM 330 and ACS 340 can employ supplementary data, e.g., 342, etc. In an aspect, CCRM 330 can be employed to manage responses based on a first scope and ACS 340 can then adapt the CCRM 330 response based on a second scope. As an example, vehicle information can be received by CCRM 330 indicating proper seatbelt function. Based on this information, CCRM can determine that an acknowledgement command can be sent to the vehicle indicating no changes to vehicle parameters. This can represent an example vehicle-centric first scope. Further, ACS component 340 can determine based on seatbelt mechanism manufacturer information that the seatbelt sensor can be in the process of being recalled for indicating proper function even when the seatbelt may be faulty. This can represent a second example scope. Based on this second scope, ACS 340 can adapt the acknowledgement command to indicate that the seatbelt is undergoing a recall and to present a message to the user to seek service. The adaptation of the command can then be propagated to the vehicle to alert users that the vehicle should be examined to determine if the seatbelt is functioning properly.

Figure 4:
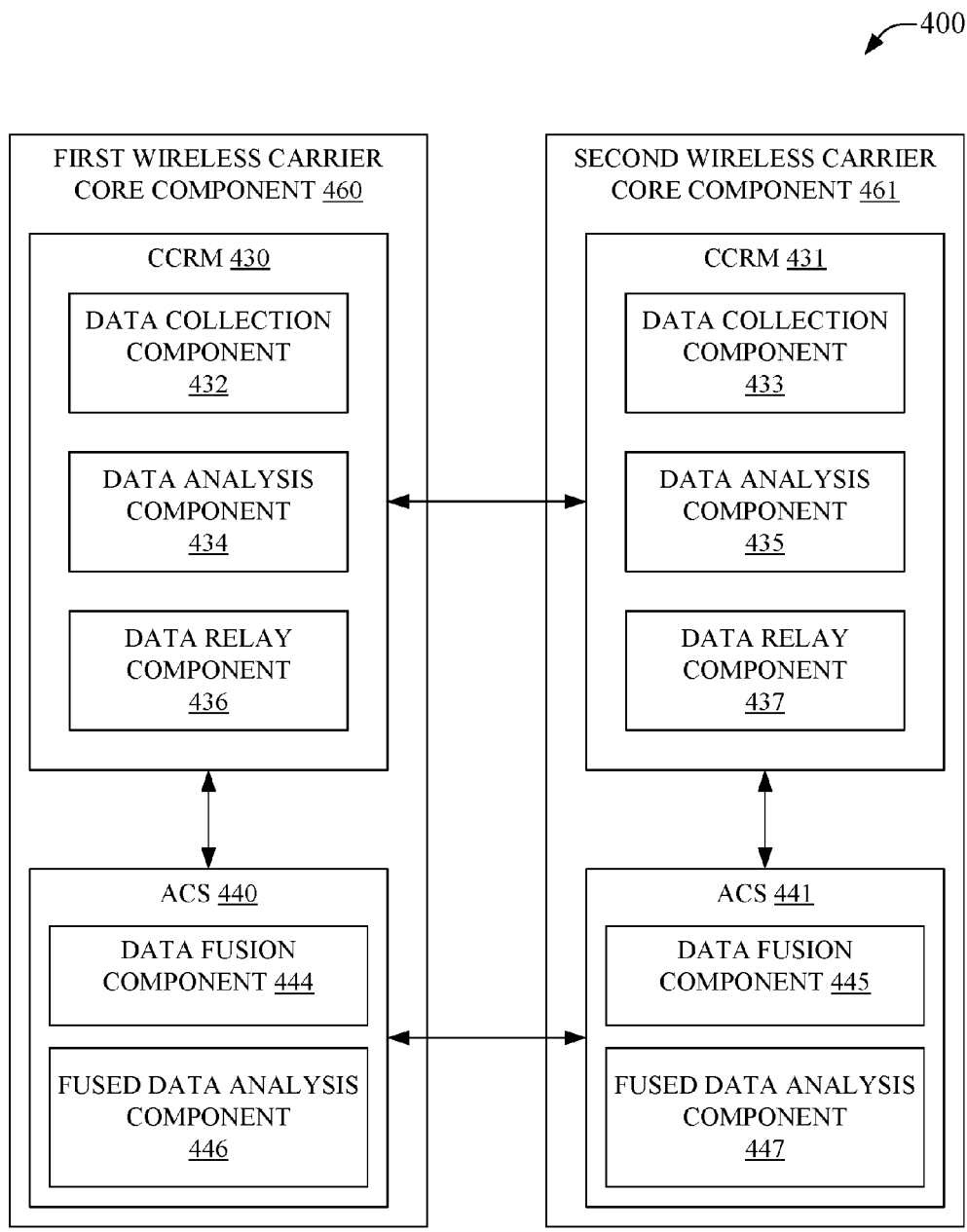
FIG. 4 illustrates an example system that facilitates management of a vehicle resource via sharing of data between network devices of networks associated with network provider in accordance with aspects of the subject disclosure.

FIG. 4 illustrates a system 400 that facilitates management of a vehicle resource based on sharing of data between network devices of networks associated with network provider in accordance with aspects of the subject disclosure. System 400 can comprise first wireless carrier core component 460 and second wireless carrier core component 461. First wireless carrier core component 460 can comprise CCRM 430 and second wireless carrier core component 461 can similarly comprise CCRM 431. CCRM 430/431 can receive vehicle data. CCRM 430, in an embodiment, can pass vehicle data to a corresponding DVCC via data relay component 436. CCRM 431 can similarly pass vehicle data to a corresponding DVCC via data relay component 437. CCRM 430/431 can return a command from a corresponding DVCC. In another embodiment, CCRM 430/431 can emulate aspects of one or more DVCCs to reduce the amount of vehicle data communicated to/from one or more DVCCs. CCRM 430/431 can be a real or virtual device.

In an aspect, a vehicle can communicate vehicle information to a control component located away from the vehicle. The control component can be operated by a manufacturer of the vehicle, can be a control component designated for communicating with the vehicle, etc. Vehicle data can be communicated to, and a reply command returned from, a DVCC via a network associated with a network carrier. In an aspect, vehicle data can be communicated to CCRM 430/431, via the network, rather than to a DVCC. Similarly, a command can be returned from CCRM 430/431 in lieu of a command from a DVCC. In an aspect, CCRM 430/431 can emulate, substitute for, or replace, one or more DVCCs.

In an aspect, emulation of aspects of a DVCC can comprise direct emulation of the DVCC, e.g., CCRM 430/431 can perform the same functions as the DVCC based on similar/same data and providing similar/same responses. For a modified emulation of the DVCC, CCRM 430/431 can perform different processing and analysis of vehicle data and/or supplementary data, and can return a corresponding command in a from that is germane to DVCC/vehicle communication but may not be the same as would otherwise be returned by a DVCC due to differences in processing of vehicle data and/or supplementary data, analysis of the processed vehicle data, application of an alternative or additional rule in generating a response command, an indication of command adaptation information, etc. In brief, CCRM 430/431 can emulate a DVCC, be a substitute for a DVCC, or be a replacement for a DVCC, wherein the substitution or replacement of the DVCC by CCRM 430/431 can perform the same, similar, or different functions of the DVCC.

CCRM 430, in an embodiment, can comprise data collection component 432. Similarly, CCRM 431 can comprise data collection component 433. In an aspect, data collection component 432/433 can capture vehicle data. In an embodiment, data collection component 432/433 can pass this information to, and return a command from, a DVCC, via the corresponding data relay component 436/437, e.g., CCRM 430/431 can be transparent to the vehicle and the DVCC. In another embodiment, data collection component 432/433 can intercept vehicle data, e.g., vehicle data is not passed on to a DVCC, wherein the processing and response is managed by a corresponding data analysis component 434/435. In other embodiments, data collection component 432/433 can forward some vehicle data to a DVCC while not communicating other data to/from the DVCC.

CCRM 430, in some embodiments, can comprise data analysis component 434, while CCRM 431 can comprise data analysis component 435. Data analysis component 434/435 can process vehicle data captured by a corresponding data collection component 432/433. In some embodiments, analysis can be further based on supplementary data. Supplementary data can be data known to a network associated with CCRM 430/431, such as vehicle location, weather, a schedule from a profile associated with aa user of a the vehicle, traffic patterns proximate to the vehicle, emergent information, transit patterns, data throughput key performance indicators (KPIs), etc. In some embodiments, supplementary data can be received directly at CCRM 430/431, e.g., via data collection component 432/433.

CCRM 430 can comprise, in some embodiments, data relay component 436, and CCRM 431 can similarly comprise data relay component 437. Data relay component 436/4337 can communicate all, some, related, or no data with a DVCC. In an embodiment where CCRM 430/431 is transparent to the DVCC and a vehicle component, data relay component 436/437 can communicate vehicle data collected by data collection component 432/433 to the DVCC and return a response from the DVCC to the vehicle. In an embodiment where CCRM 430/431 is not transparent, data relay component 436/437 can communicate some or different data to the DVCC, e.g., CCRM 430/431 can manage designated tasks and relay other information to a DVCC for management of non-designated tasks, data relay component 436/437 can communicate summary data, etc. In embodiments where CCRM 430/431 is a replacement for DVCC, no data may be communicated with/from a DVCC by data relay component 436/437 because CCRM 430/431 itself manages all communication tasks with the vehicle as a replacement for the DVCC.

First wireless carrier core component 460 can further comprise ACS 440 and second wireless carrier core component 461 can further comprise ACS 441. In an aspect, ACS 440/441 can communicate with the corresponding CCRM 430/431. ACS 440/441 can emulate aspects of CCRMs, e.g., 430/431, perform additional analysis, etc., to allow for improved management of a connected vehicle, as disclosed herein. In an embodiment, ACS 440/441 can offload functions from CCRM 430/431. Offloading of functionality can allow CCRM 430/431 to be allocated to a first tier of tasks and ACS 440/441 to be allocated to a second tier of tasks. In an aspect ACS 440/441 can comprise rule silos, e.g., related to vehicle manufacturers, etc. This can enable vehicle manufacturers, aftermarket parts suppliers, etc., to specify appropriate response commands based on a type of vehicle, part, modification, etc. As such, CCRM 430/431 can generate a suggested response that can be altered by the corresponding ACS 440/441 based on the siloed rules.

ACS 440/441 can receive supplementary data. In an aspect, supplementary data can be made accessible to CCRM 430/431 by corresponding ACS 440/441. Supplementary data can further be employed by ACS 440/441 to process offloaded CCRM 430/431 functionality. In an embodiment, ACS 440 can comprise data fusion component 444 and ACS 441 can comprise data fusion component 445, which can fuse data from multiple sources. Fused data analysis component 446/447 can analyze the fused data to determine command adaptation information. Command adaptation information can enable adaptation of a command, e.g., as determined by CCRM 430/431, to be made available to a vehicle. In some embodiments, both CCRM 430/431 and ACS 440/441 can employ supplementary data. In an aspect, CCRM 430/431 can be employed to manage responses based on a first scope and ACS 440/441 can then adapt the CCRM 430/431 response based on a second scope.

System 400 further illustrates that CCRM 430 can communicate information to CCRM 431. This can enable CCRM 431 information to be treated as supplementary data in responses generated by CCRM 430. Similarly, CCRM 430 information can be treated as supplementary data in responses generated by CCRM 431. Correspondingly, ACS 440 can communicate information to ACS 441. This can enable ACS 441 information to be treated as supplementary data in command adaptation information generated by ACS 440. Similarly, ACS 440 information can be treated as supplementary data in command adaptation information generated by ACS 441. This aspect can enable different network carriers to share information related to CCRM/ACS operation. As such, for a given region associated with a plurality of network carriers, the combined vehicle information associated with the sum of all the vehicles connected to each carrier can be leveraged to provide responses to collected vehicle data. Generally, this multicarrier vehicle information can be far more substantial than vehicle information associated with a single vehicle manufacturer, e.g., siloed vehicle information. As such, response commands can reflect improved responses resulting from analysis reflecting the heterogeneous vehicle environment.

Figure 5:
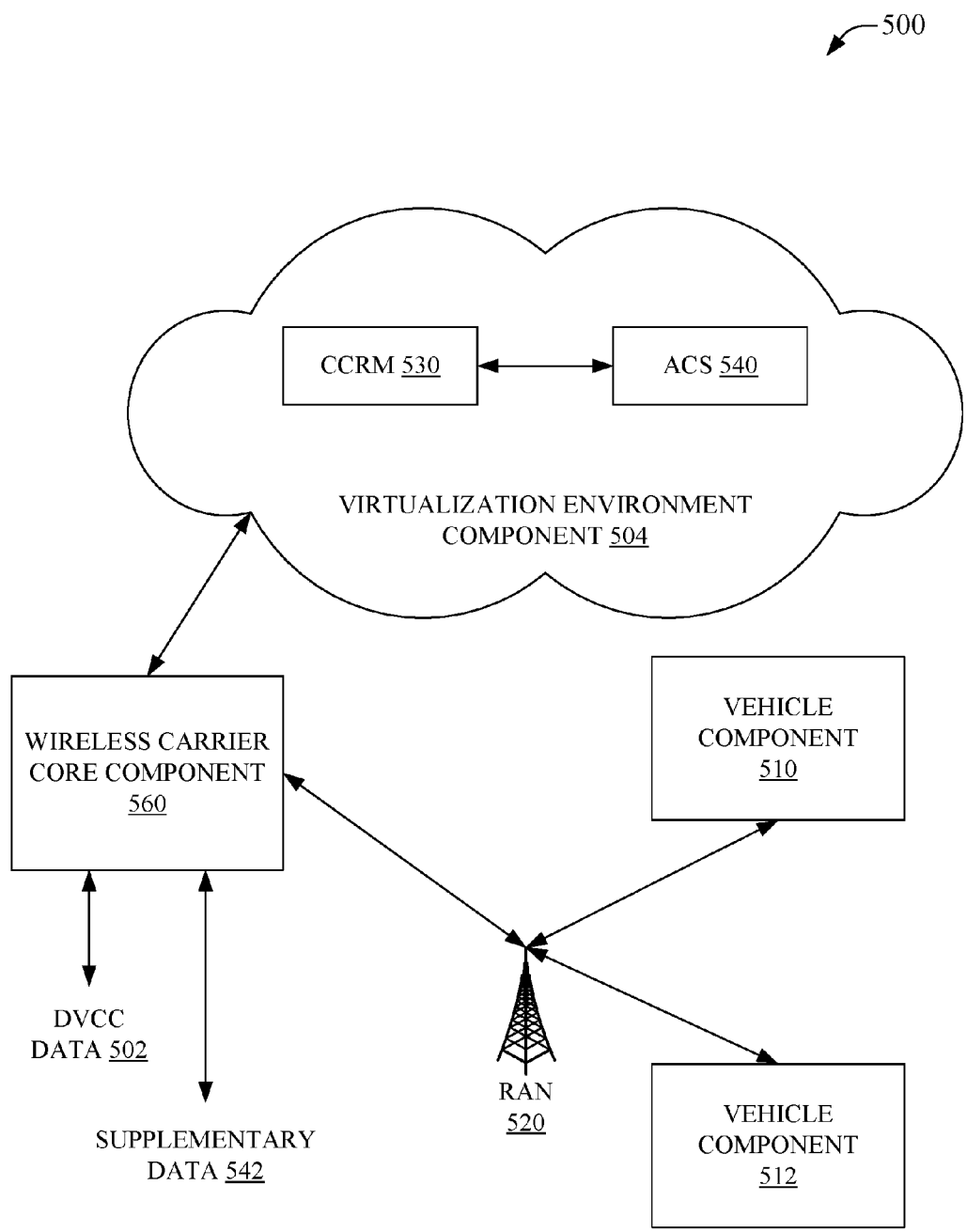
FIG. 5 illustrates an example system that facilitates management of a vehicle resource via a virtualized network device of a network associated with a network provider in accordance with aspects of the subject disclosure.

FIG. 5 illustrates a system 500 that facilitates management of a vehicle resource via a virtualized network device of a network associated with a network provider in accordance with aspects of the subject disclosure. System 500 can comprise vehicle component 510 and vehicle component 512. In an aspect, vehicle component 510 can communicate vehicle information to a control component, via RAN 520, located away from a corresponding vehicle. Similarly, vehicle component 512 can communicate, via RAN 520, vehicle information to the same, or different, control component located away from another corresponding vehicle. The control component(s) can be operated by a manufacturer(s) of the vehicles corresponding to vehicle components 510 and 512, can be a control component(s) designated for communicating with vehicle components 510 and 512, etc. As an example, an alpha-brand vehicle can comprise vehicle component 510 and a beta-brand vehicle can comprise vehicle component 512. In this example, vehicle component 510 can communicate data with an alpha-brand DVCC to respond with commands that update an aspect of the alpha-brand vehicle based on the corresponding communicated data and vehicle component 512 can communicate data with a beta-brand DVCC to respond with commands that update an aspect of the beta-brand vehicle based on the corresponding communicated data. Vehicle data from vehicle component 510/512 can be communicated to, and a reply command returned from, a corresponding DVCC (not illustrated) via DVCC data 502 and wireless carrier core component 560. In an aspect, vehicle data can be communicated to CCRM 530, via wireless carrier core component 560, rather than to a DVCC. Similarly, a command to vehicle component 510/512 can be returned from CCRM 530 in lieu of a command from a DVCC. In an aspect, CCRM 530 can emulate, substitute for, or replace, one or more DVCCs, e.g., CCRM 530 can receive from, or send to, vehicle component 510 and 512, rather than vehicle component 510 and 512 communicating with one or more corresponding DVCCs. As an example, where vehicle component 510 is associated with an alpha-brand vehicle that would normally communicate with an alpha-brand DVCC and vehicle component 512 is associated with a beta-brand vehicle that would normally communicate with a beta-brand DVCC, CCRM 530 can function to emulate/substitute/replace one or both the alpha- and beta-brand DVCCs. As a further example, where vehicle component 510 and 512 are both associated with an alpha-brand vehicle that would normally communicate with an alpha-brand DVCC, CCRM 530 can function to emulate/substitute/replace the alpha-brand DVCC.

System 500 can comprise virtualization environment component 504 that can comprise a virtualized embodiment of CCRM 530 and/or a virtualized embodiment of ACS 540. CCRM 530 can receive vehicle data from vehicle component 510 and 512 via RAN 520 and wireless carrier core component 560. CCRM 530, in an embodiment, can pass vehicle data to a corresponding DVCC as DVCC data 502 via wireless carrier core component 560. CCRM can return a command from a corresponding DVCC, e.g., comprised in DVCC data 502, to vehicle component 510/512 via wireless carrier core component 560 and RAN 520. In another embodiment, CCRM 530 can emulate aspects of one or more DVCCs to reduce the amount of vehicle data communicated to/from a DVCC.

In an aspect, emulation of aspects of a DVCC can comprise direct emulation of the DVCC, e.g., the CCRM performs the same functions as the DVCC based on similar/same data and providing similar/same responses, or a modified emulation of the DVCC, e.g., CCRM 530 can perform different processing and analysis of vehicle data from vehicle component 510/512 and/or supplementary data 542, and can return a corresponding command in a from that is germane to DVCC/vehicle communication but may not be the same as would be returned by a DVCC due to differences in processing of vehicle data and/or supplementary data 542, analysis of the processed vehicle data, application of an alternative or additional rule in generating a response command, an indication of command adaptation information, etc. In brief, CCRM 530 can emulate a DVCC, be a substitute for a DVCC, or be a replacement for a DVCC, wherein the substitution or replacement of the DVCC by CCRM 530 can perform the same, similar, or different functions of the DVCC.

In an aspect, CCRM 530 can intercept vehicle data from vehicle component 510/512. In an embodiment, CCRM 530 can simply pass this information to, and return a command from, a DVCC, e.g., via DVCC data 502, resulting in CCRM 530 being transparent to the vehicle and DVCC. In another embodiment, CCRM 530 can receive and respond to vehicle data from vehicle component 510/512 directly, e.g., vehicle data is not passed on to a DVCC and the processing and response thereto is managed by CCRM 530. In this type of embodiment, CCRM 530 can report out DVCC data 502 that can be, for example, a summary of communications with one or more vehicles and responses thereto, rather than passing vehicle data to generate a reply command. DVCC data 502 can comprise other information relating to the interaction between vehicle component 510/512 and CCRM 530 as well. In other embodiments, CCRM 530 can forward some vehicle data to a DVCC while not communicating other data to/from the DVCC.

Virtualization environment component 504 can further comprise ACS 540. In an aspect, ACS 540 can communicate with CCRM 530. ACS 540 can emulate aspects of CCRM 530, perform additional analysis, etc., to allow for improved management of a connected vehicle as disclosed herein. In an embodiment, ACS 540 can offload functions from CCRM 530. Offloading of functionality can allow CCRM 530 to be allocated to a first tier of tasks and ACS 540 to be allocated to a second tier of tasks. In an aspect ACS 540 can comprise rule silos, e.g., related to vehicle manufacturers, etc. This can enable vehicle manufacturers, aftermarket parts suppliers, etc., to specify appropriate response commands based on a type of vehicle, part, modification, etc. As such, CCRM 530 can generate a suggested response that can be altered by ACS 540 based on the siloed rules.

Figure 6:
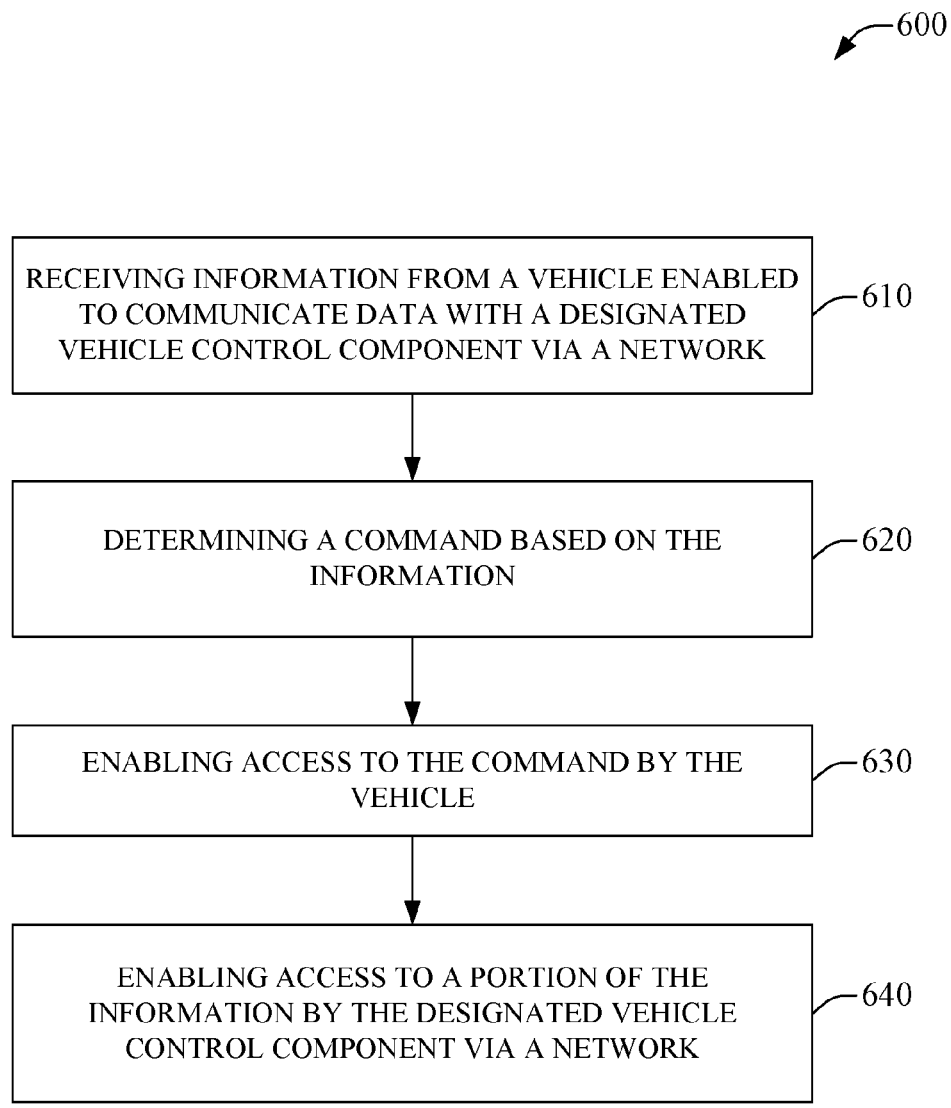
FIG. 6 illustrates an example method facilitating management of a vehicle resource via a network device of a network associated with a network provider in accordance with aspects of the subject disclosure.
Figure 7:
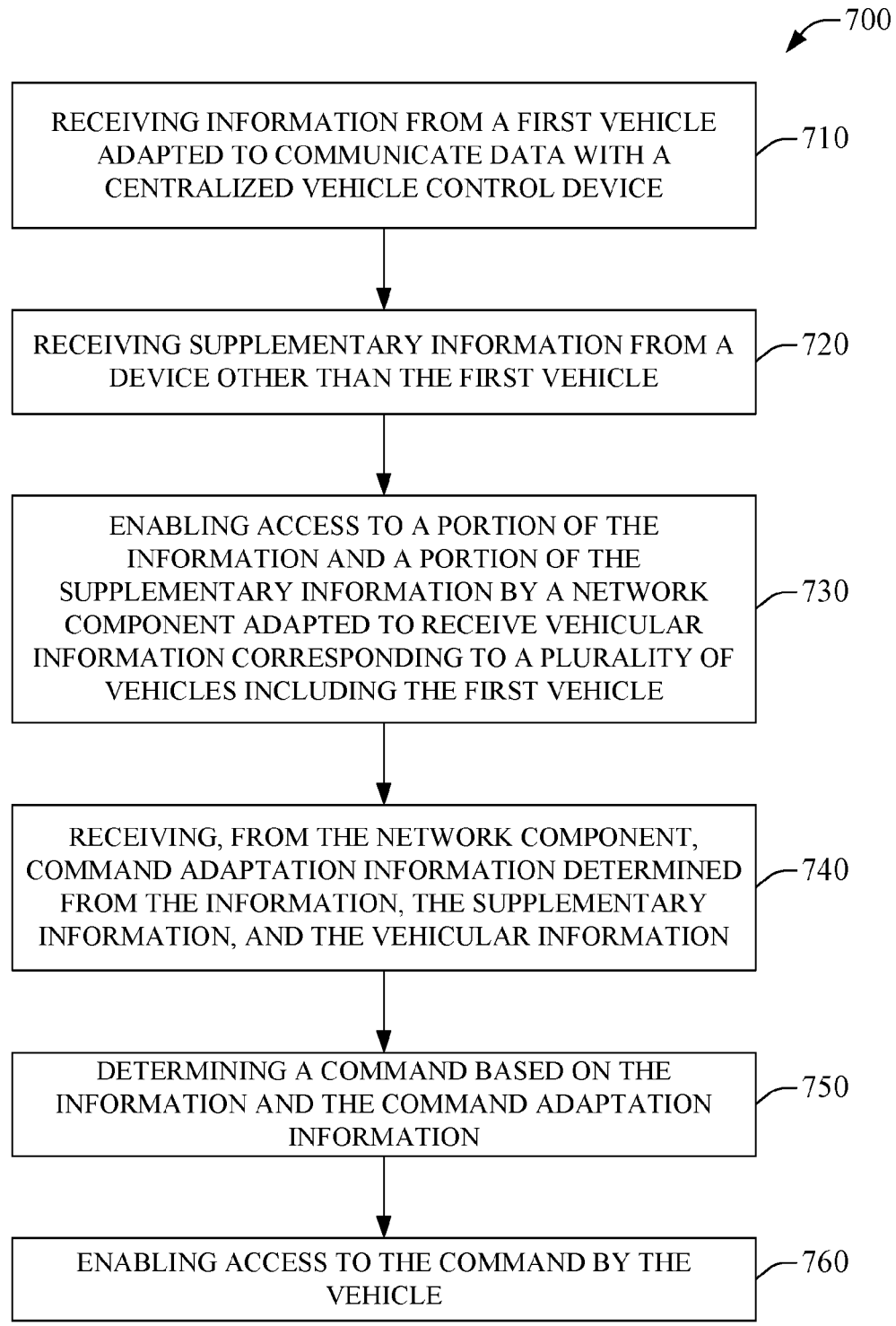
FIG. 7 depicts an example method facilitating management of a vehicle resource, based on information for a plurality of vehicles, via a network device of a network associated with a network provider in accordance with aspects of the subject disclosure.
Figure 8:
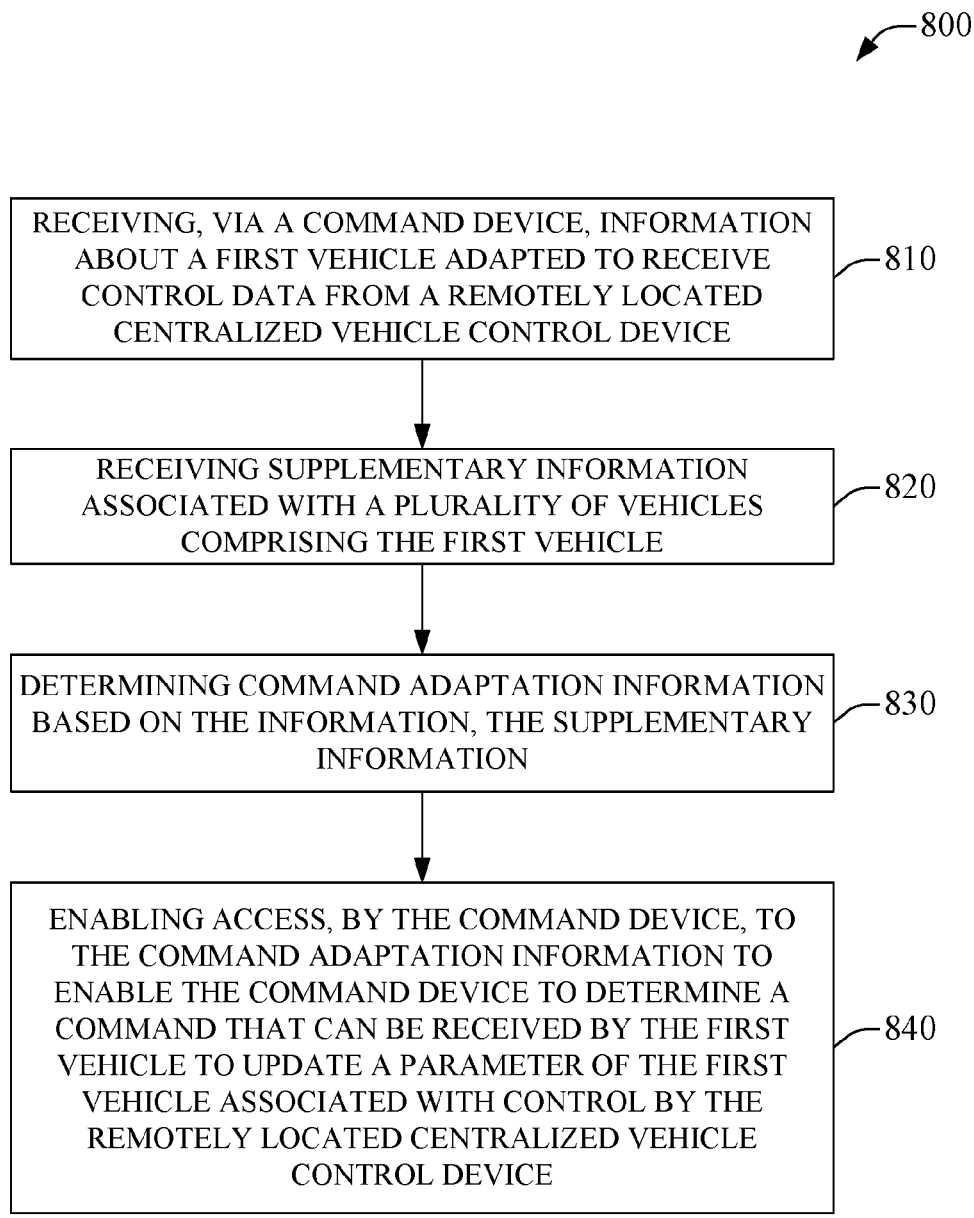
FIG. 8 illustrates an example method facilitating determining by a network device associated with a network provider, based on information for a plurality of vehicles, adaptation of commands related to management of a vehicle resource in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 that facilitates managing a vehicle resource via a network device of a network associated with a network provider in accordance with aspects of the subject disclosure. At 610, method 600 can comprise receiving information from a vehicle. The vehicle can be enabled to communicate data with a designated vehicle control component (DVCC) via a network. The DVCC can be located distant from the vehicle. The DVCC can be operated by a manufacturer of the vehicle, can be operated by another entity designated by vehicle manufacturer, etc. As an example, an alpha-brand vehicle can communicate data with an alpha-brand DVCC operated by an entity of the alpha-brand and can respond with commands that update an aspect of the alpha-brand vehicle based on the communicated data. As another example, an alpha-brand vehicle can communicate data with an DVCC operated by an entity other than the alpha-brand, but designated by the alpha-brand entity, and can respond with commands that update an aspect of the alpha-brand vehicle based on the communicated data.

In an aspect, the information from 610 can be received prior to be being received by the DVCC, e.g., by CCRM 130-530, etc. In an embodiment, the example CCRM, e.g., 130-530, etc., can the information to/from a DVCC, e.g., the example CCRM can be network transparent to the vehicle and the DVCC. In another embodiment, the example CCRM can emulate aspects of a DVCC to reduce the amount of vehicle data communicated to/from a DVCC or even eliminate communication with the DVCC. In an embodiment, the example CCRM can report out DVCC data that, for example, can be a summary of communications with one or more vehicles and responses thereto, e.g., a reporting function, rather than passing vehicle data to generate a reply command, reporting of supplementary data, performance information relating to the operation of a CCRM, vehicular trends based on CCRM operations with a plurality of vehicles, etc. In other embodiments, the example CCRM can forward some vehicle data to a DVCC while not communicating other data to/from the DVCC. In these embodiments, a CCRM can manage, for example, typical responses but pass on unusual vehicle data to the DVCC for a response thereto. As other examples, a vehicle manufacturer can specify what functions a CCRM can or cannot manage in lieu of a DVCC, a CCRM can manage overflow conditions where a DVCC may be overburdened or otherwise unavailable, etc. As such, nearly any condition can be used to demark what aspects of a vehicle are managed by a DVCC and what are managed by a CCRM, all of which scenarios are considered within the scope of the present disclosure.

At 620, method 600 can comprise, determining a command based on the information received at 600. The command can be determined from intercept vehicle data, e.g., information received at 610. In an embodiment, emulation of aspects of a DVCC can comprise direct emulation of the DVCC, e.g., a CCRM can perform the same functions as the DVCC based on similar/same data and providing similar/same responses. In another embodiment, a modified emulation of the DVCC can be performed by different processing and different analysis of vehicle data, e.g., the information received at 610, and/or supplementary data, and can return a corresponding command in a from that is germane to DVCC/vehicle communication but may not be the same as would be returned by a DVCC due to differences in processing of vehicle data and/or supplementary data, analysis of the processed vehicle data, application of an alternative or additional rule in generating a response command, an indication of command adaptation information, etc. In brief, a CCRM can emulate a DVCC, be a substitute for a DVCC, or be a replacement for a DVCC, wherein the substitution or replacement of the DVCC by a CCRM can perform the same, similar, or different actions as the DVCC. In an aspect, a CCRM can be comprised in a network edge device, in a core-network device, in a cloud-computing environment device, etc. A CCRM can be a real or virtual device.

At 630, method 600 can comprise, enabling access to the command determined at 620 by the vehicle. This can allow an aspect of the vehicle to be altered in response to the information received by method 600 at 610. The command can adapt, modify, create, or remove a feature, parameter, system, operation, etc., of the vehicle.

Method 600, at 640 can comprise, enabling access to a portion of the information by a DVCC via the network. At this point method 600 can end. As stated hereinabove, a CCRM can pass some, none, all, or a modification of the information to a DVCC. In an aspect, this can allow the DVCC to remain current on interaction being performed on vehicles associated with the DVCC by a manufacturer. In another aspect, this can allow a DVCC to be responsive to operations not managed by a CCRM.

FIG. 7 illustrates a method 700 that facilitates managing a vehicle resource, based on information for a plurality of vehicles, via a network device of a network associated with a network provider in accordance with aspects of the subject disclosure. At 710, method 700 can comprise receiving information from a first vehicle. The first vehicle can be adapted to communicate data with a centralized vehicle control device, e.g., a DVCC. The DVCC can be located distant from the vehicle. The DVCC can be operated by a manufacturer of the vehicle, can be operated by another entity designated by vehicle manufacturer, etc. In an aspect, the information from 710 can be received before reaching the DVCC. In an embodiment, an example CCRM, e.g., 130-530, etc., can communicate all the information to/from a DVCC, e.g., the example CCRM can be network transparent to the vehicle and the DVCC. In another embodiment, the example CCRM can emulate aspects of a DVCC to reduce the amount of vehicle data communicated to/from a DVCC or even eliminate communication with the DVCC. In an embodiment, the example CCRM can report out DVCC data that, for example, can be a summary of communications with one or more vehicles and responses thereto, e.g., a reporting function, rather than passing vehicle data to generate a reply command, reporting of supplementary data, performance information relating to the operation of a CCRM, vehicular trends based on CCRM operations with a plurality of vehicles, etc. In other embodiments, the example CCRM can forward some vehicle data to a DVCC while not communicating other data to/from the DVCC. In these embodiments, a CCRM can manage, for example, typical responses but pass on unusual vehicle data to the DVCC for a response thereto. As other examples, a vehicle manufacturer can specify what functions a CCRM can or cannot manage in lieu of a DVCC, a CCRM can manage overflow conditions where a DVCC may be overburdened or otherwise unavailable, etc. As such, nearly any condition can be used to demark what aspects of a vehicle are managed by a DVCC and what are managed by a CCRM, all of which scenarios are considered within the scope of the present disclosure.

At 720, method 700 can comprise, receiving supplementary information from a device other than the first vehicle. Supplementary information can be data known to a network associated with method 700, such as vehicle location, weather, a schedule from a profile associated with aa user of a the vehicle, traffic patterns proximate to the vehicle, emergent information, transit patterns, data throughput, KPIs, etc.

At 730, method 700 can comprise, enabling access to a portion of the information and a portion of the supplementary information by a network component adapted to receive vehicular information corresponding to a plurality of vehicles including the first vehicle. The network component can be a different component than a device performing method 700. In an embodiment, emulation of aspects of a DVCC can comprise direct emulation of the DVCC. In another embodiment, a modified emulation of the DVCC can be performed by processing and analyzing the information the supplementary information, and can return a corresponding command in a from that is germane to DVCC/vehicle communication but may not be the same as would be returned by a DVCC due to differences in processing of vehicle data and/or supplementary data, analysis of the processed vehicle data, application of an alternative or additional rule in generating a response command, an indication of command adaptation information, etc. In brief, an emulation of a DVCC, be a substitute for a DVCC, or be a replacement for a DVCC, wherein the substitution or replacement of the DVCC can perform the same, similar, or different actions as the DVCC. In an aspect, an emulation can be performed on a network edge device, in a core-network device, in a cloud-computing environment device, etc. The emulation can be performed by a real or virtual device.

At 740, method 700 can comprise, receiving from the network component, command adaptation information determined from the portion of the information, the portion of the supplementary information, and the vehicular information. The command adaptation information can be employed to adapt a command that can be sent to the first vehicle. At 750, a command based on the information and the command adaption information can be determined by method 700. The command can comprise information or instructions for adapting a vehicle system, feature, etc., of the first vehicle, in response to the information received from the first vehicle at 710.

At 760, the first vehicle can be access the command determined at 750. At this point, method 700 can end. The command can adapt, modify, create, or remove a feature, parameter, system, operation, etc., of the first vehicle.

FIG. 8 illustrates a method 800 that facilitates determining by a network device associated with a network provider, based on information for a plurality of vehicles, adaptation of commands related to management of a vehicle resource in accordance with aspects of the subject disclosure. At 810, method 800 can comprise receiving, via a command device, information about a first vehicle. The first vehicle can be adapted to receive control data from a remotely located centralized vehicle control device. In an aspect, the remotely located centralized vehicle control device can be a DVCC and can be emulated by a command device, e.g., CCRM 130-530, etc.

At 820, supplementary information associated with a plurality of vehicles comprising the first vehicle can be received. Supplementary information can be data known to a network associated with method 800, such as vehicle location, weather, a schedule from a profile associated with aa user of a the vehicle, traffic patterns proximate to the vehicle, emergent information, transit patterns, data throughput, KPIs, etc.

At 830, method 800 can comprise, determining command adaptation information based on the information and the supplementary information. Command adaptation information can be employed to adapt a command that can be sent to the first vehicle in response to the information and supplementary information from 810 and 820 respectively.

At 840, access to the command adaptation information can be enabled for the command device. At this point method 800 can end. This can enable the command device to determine a command that can be communicated to and received by the first vehicle to update a parameter of the first vehicle associated with control by the remotely located centralized control device.

Figure 9:
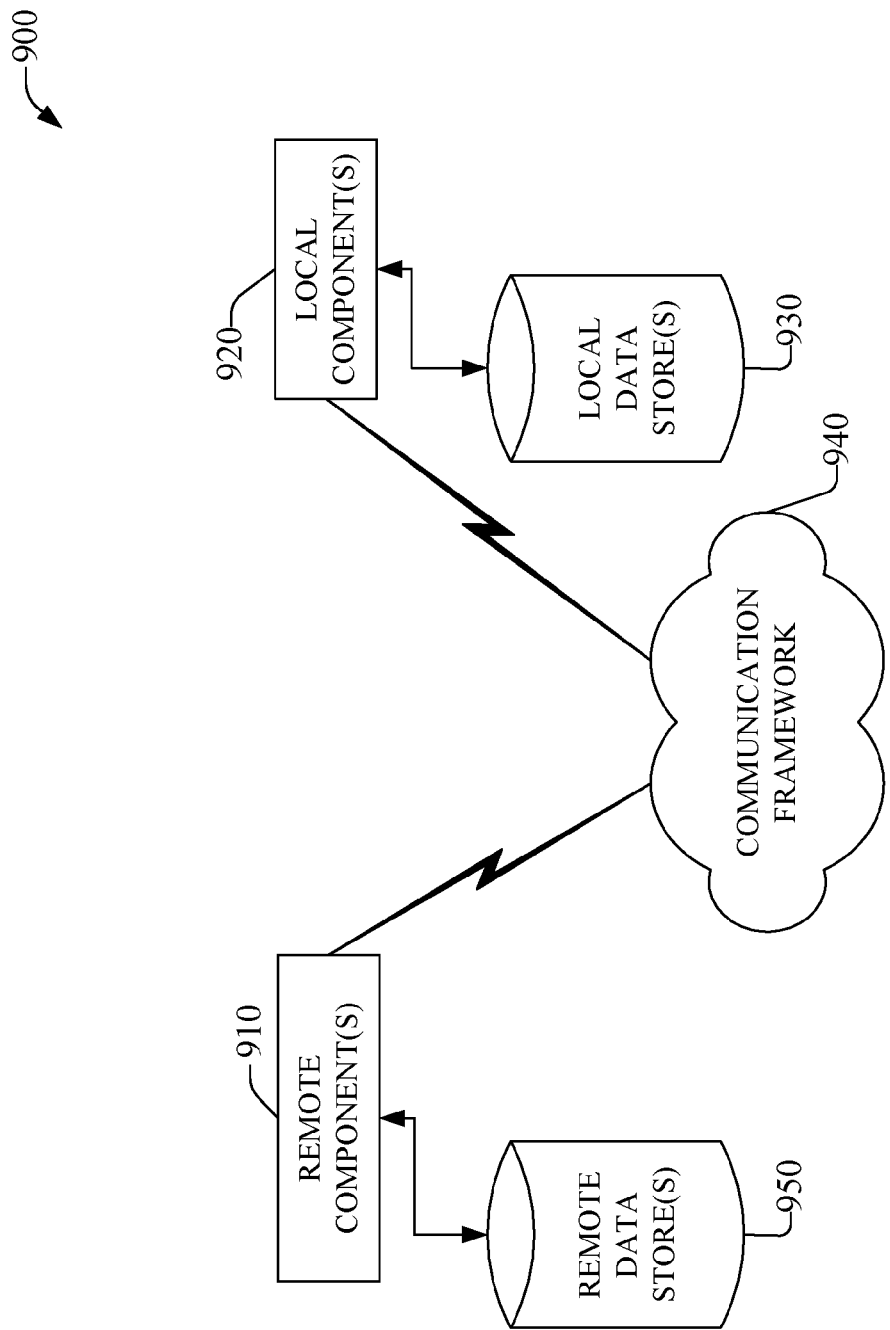
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be vehicle component 110, 210, 212, 510, 512, etc., a DVCC receiving DVCC data 102-302, 502, etc., wireless carrier core component 560, etc.

The system 900 also comprises one or more local component(s) 920. The local component(s) 920 can be hardware and/or software (e.g., threads, processes, computing devices). In some embodiments, local component(s) 920 can comprise, for example, CCRM 130-330, 430, 431, 530, etc., ACS 240-440, 441, 540, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
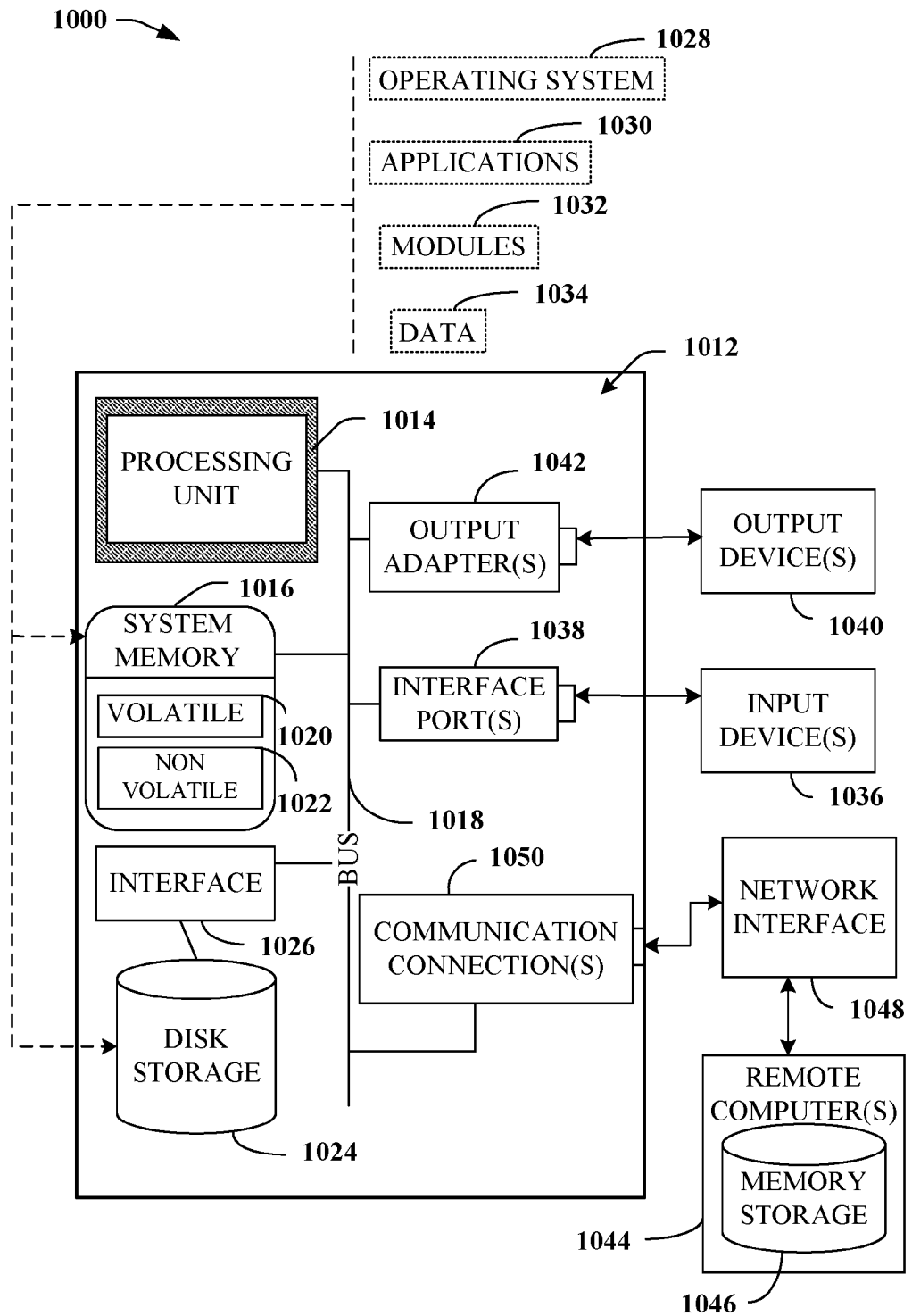
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, CCRM 130-430, 431, 530, etc., ACS 240-440, 441, 540, etc., vehicle component 110, 210, 212, 510, 512, etc., wireless carrier core component 460, 461, 560, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable programmable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving vehicle information, e.g., from vehicle component 110, 210, 212, 510, 512, etc., and in response, generating a command or adapted command that can be accessed via an air interface or other wireless interface by one or more vehicle(s) to enable adaptation of a vehicle system or parameter.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, vehicle component 110, 210, 212, 510, 512, etc., CCRM 130, 430, 431, 530, etc., ACS 240-440, 441, 540, etc., can receive touch, motion, audio, visual, or other types of input, e.g., vehicle data, response rule(s), designation of managing response(s) via CCRM /ACS or DVCC, etc., as input by a user via a user interface that is located either local or remote from the vehicle component, CCRM, ACS, etc. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
 a processor; and
 a memory that stores executable instructions that, when executed by the processor, facilitate performance of operations, comprising:
  determining a first state of a first network-connected vehicle based on information from a first vehicle diagnostic device associated with a system of the first network-connected vehicle;
  determining, based on the first state, an update to a setting of the system; and
  enabling access to the update to the setting from an update source located in a communications path between the first network-connected vehicle and an update device associated with a manufacturer of the first network-connected vehicle.

2. The device of claim 1, wherein the device is located in the first network-connected vehicle.

3. The device of claim 1, wherein the device is not located in the first network-connected vehicle.

4. The device of claim 1, wherein the determining the update is further based on information received from a source other than the first network-connected vehicle.

5. The device of claim 4, wherein the information is weather information related to a weather condition proximate to a location of the first network-connected vehicle.

6. The device of claim 4, wherein the information is related to a second network-connected vehicle.

7. The device of claim 6, wherein the second network-connected vehicle is determined to be within a defined proximity to the first network-connected vehicle.

8. The device of claim 6, wherein the second network-connected vehicle is determined to be outside a defined proximity to the first network-connected vehicle.

9. The device of claim 1, wherein the enabling the access is in response to satisfying an access condition.

10. The device of claim 9, wherein the access condition is related to a subscription status.

11. The device of claim 9, where the access condition is related to a permission input associated with an identity of an entity designated by the manufacturer of the first network-connected vehicle.

12. The device of claim 1, wherein the enabling the access comprises enabling the access to the update of the setting by the first network-connected vehicle.

13. The device of claim 1, wherein the enabling the access comprises enabling the access to the update of the setting by an entity device located at a wireless network provider core-network device that is associated with an entity designated by the manufacturer of the first network-connected vehicle.

14. A method, comprising:
receiving, by a network device comprising a processor, vehicle information related to a state of a vehicle connected to a network of which the network device is a part, wherein the network device is comprised in a network of a wireless network provider;
determining, by the network device, an update to a setting of the vehicle based on the vehicle information; and
enabling, by the network device, access by the vehicle to the update stored at a storage device comprised in the network of the wireless network provider.

15. The method of claim 14, wherein the receiving comprises intercepting the vehicle information prior to the vehicle information being received by a control device located apart from the vehicle and associated with a manufacturer of the vehicle.

16. The method of claim 14, further comprising:
in response to enabling access to the update by a regional network controller, receiving, by the network device, an adaptation of the update to the setting of the vehicle; and
substituting, by the network device, the adaptation of the update for the update prior to the enabling the access by the vehicle to the update.

17. The method of claim 16, wherein the adaptation of the update is based on aggregated vehicle settings for vehicles connected to the network.

18. A non-transitory machine-readable storage medium, comprising executable instructions that, when executed by a processor, facilitate performance of operations, comprising:
receiving, by a network device of a network associated with a wireless network provider, vehicle information related to a first state of a first vehicle connected to network devices of the network;
determining an update to a setting of the vehicle based on the vehicle information; and
enabling access by the vehicle to the update via a storage device of the network of the wireless network provider.

19. The non-transitory machine-readable storage medium of claim 18, wherein the operations further comprise:
in response to sharing the update to a regional network controller, receiving, from the regional network controller, an adaptation of the update to the setting of the vehicle; and
substituting the adaptation of the update for the update prior to the enabling the access by the vehicle to the update.

20. The non-transitory machine-readable storage medium of claim 19, wherein the adaptation of the update is based on a second state of a second vehicle connected to the network devices.

* * * * *